United States Patent
Gao et al.

(10) Patent No.: US 10,686,891 B2
(45) Date of Patent: Jun. 16, 2020

(54) MIGRATION OF APPLICATIONS TO A COMPUTING ENVIRONMENT

(71) Applicant: International Business Machines Corporation, Armonk, NY (US)

(72) Inventors: Xue Feng Gao, Haidian District (CN); Chao Yu, Ningbo (CN); Qing Feng Zhang, Beijing (CN); Jin Rong Zhao, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 200 days.

(21) Appl. No.: 15/812,347

(22) Filed: Nov. 14, 2017

(65) Prior Publication Data
US 2019/0149617 A1    May 16, 2019

(51) Int. Cl.
*G06F 15/16* (2006.01)
*H04L 29/08* (2006.01)
(Continued)

(52) U.S. Cl.
CPC .............. *H04L 67/148* (2013.01); *G06F 8/20* (2013.01); *G06F 8/60* (2013.01); *H04L 67/06* (2013.01);
(Continued)

(58) Field of Classification Search
USPC ........................................................ 709/218
See application file for complete search history.

(56) References Cited

U.S. PATENT DOCUMENTS 7,203,944 B1 * 4/2007 van Rietschote ... G06F 9/45533
                                                          718/1
7,257,811 B2 * 8/2007 Hunt ..................... G06F 9/4856
                                                        707/999.2
(Continued)

OTHER PUBLICATIONS

Wei Guo et al., "Optimal Fault Tolerance Strategy Selection for Application Migration in Federated Hybrid Cloud", 2015 IEEE Fifth International Conference on Big Data and Cloud Computing (BDCloud), Aug. 26-28, 2015, Retrieved from the Internet: <URL: http://ieeexplore.ieee.org/document/7310719/>, all pages.
(Continued)

*Primary Examiner* — Alicia Baturay
(74) *Attorney, Agent, or Firm* — Law Offices of Ira D. Blecker, P.C.

(57) ABSTRACT

A method of migrating an application to a computing environment including: obtaining a service topology and a deployment sequence from an existing application; choosing a deployment preference, each deployment preference containing factors and a weight of each of the factors; outputting the service topology and the deployment preference; reading service records for the chosen service topology and deployment preference from a repository, the service records containing a value score and weight mapping information of each factor of each service record; performing a mock conversion of migrating the application to the computing environment; adjusting the value score and weight mapping of the service records according to the results of the mock conversion; responsive to a user choosing one service record representing a solution for migrating the application to the computing environment, generating files for the solution; and deploying the solution into the computing environment using the files.

20 Claims, 9 Drawing Sheets

| FACTORS | CPU RATIO | MEM RATIO | DISK RATIO | I/O RATIO | NET DELAY |
|---|---|---|---|---|---|
| VALUE-SCORE MAPPING | <20%: 100<br><40%: 80<br><60%: 60<br><80%: 40<br><100%: 20 | <20%: 100<br><40%: 80<br><60%: 60<br><80%: 40<br><100%: 20 | <20%: 100<br><40%: 80<br><60%: 60<br><80%: 40<br><100%: 20 | <20%: 100<br><40%: 80<br><60%: 60<br><80%: 40<br><100%: 20 | <5ms: 100<br><20ms: 80<br><60ms: 60<br><120ms: 40<br>others: 20 |
| WEIGHT | 0.3 | 0.2 | 0.1 | 0.2 | 0.2 |

(51) Int. Cl.
*G06F 8/60* (2018.01)
*G06F 8/20* (2018.01)
*G06F 9/48* (2006.01)

(52) U.S. Cl.
CPC .............. *H04L 67/10* (2013.01); *H04L 67/34* (2013.01); *G06F 9/4856* (2013.01)

(56) References Cited

U.S. PATENT DOCUMENTS

| | | | | |
|---|---|---|---|---|
| 7,603,670 | B1 * | 10/2009 | van Rietschote | G06F 9/4856 |
| | | | | 718/1 |
| 7,680,919 | B2 * | 3/2010 | Nelson | G06F 9/45558 |
| | | | | 709/223 |
| 7,730,486 | B2 * | 6/2010 | Herington | G06F 9/5077 |
| | | | | 709/223 |
| 7,801,994 | B2 * | 9/2010 | Kudo | G06F 9/5044 |
| | | | | 709/226 |
| 8,156,490 | B2 * | 4/2012 | Bozek | G06F 9/5077 |
| | | | | 718/1 |
| 8,239,863 | B2 * | 8/2012 | Bhat | G06F 9/4856 |
| | | | | 711/6 |
| 8,352,953 | B2 * | 1/2013 | Bozek | H04L 41/0806 |
| | | | | 718/104 |
| 8,418,185 | B2 * | 4/2013 | Durham | G06F 9/5077 |
| | | | | 709/201 |
| 8,423,646 | B2 * | 4/2013 | Jamjoom | G06F 9/5077 |
| | | | | 709/203 |
| 8,473,557 | B2 * | 6/2013 | Ramakrishnan | G06F 9/4856 |
| | | | | 709/206 |
| 8,504,670 | B2 * | 8/2013 | Wu | G06F 16/188 |
| | | | | 709/223 |
| 8,694,644 | B2 * | 4/2014 | Chen | G06F 9/4856 |
| | | | | 709/226 |
| 8,705,513 | B2 * | 4/2014 | Van Der Merwe | H04L 47/72 |
| | | | | 370/351 |
| 8,719,143 | B2 * | 5/2014 | Meijer | G06F 16/214 |
| | | | | 705/37 |
| 8,745,234 | B2 * | 6/2014 | Liu | G06F 9/4856 |
| | | | | 709/226 |
| 8,826,272 | B2 * | 9/2014 | Glikson | G06F 9/5077 |
| | | | | 709/226 |
| 8,880,773 | B2 * | 11/2014 | Costa | G06F 9/5077 |
| | | | | 709/224 |
| 9,166,890 | B2 * | 10/2015 | Maytal | G06F 11/3428 |
| 9,268,583 | B2 * | 2/2016 | Tsirkin | G06F 9/455 |
| 9,294,524 | B2 * | 3/2016 | Raman | H04L 65/403 |
| 9,411,626 | B2 | 8/2016 | Ghosh et al. | |
| 9,461,969 | B2 * | 10/2016 | Watt | H04L 63/0272 |
| 9,692,632 | B2 * | 6/2017 | Bhattacharya | H04L 67/1097 |
| 9,811,365 | B2 * | 11/2017 | Borthakur | G06F 9/45558 |
| 9,858,125 | B2 * | 1/2018 | Bose | G06F 9/5088 |
| 9,936,014 | B2 * | 4/2018 | Fang | H04L 67/1095 |
| 9,959,157 | B1 * | 5/2018 | Adogla | G06F 9/45558 |
| 10,038,629 | B2 * | 7/2018 | Fang | G06F 9/45558 |
| 2008/0080526 | A1 * | 4/2008 | Gounares | H04L 41/147 |
| | | | | 370/401 |
| 2013/0332588 | A1 | 12/2013 | Maytal et al. | |
| 2014/0122577 | A1 * | 5/2014 | Balasubramanian | |
| | | | | G06F 9/5072 |
| | | | | 709/203 |
| 2014/0143011 | A1 | 5/2014 | Mudugu et al. | |
| 2015/0134965 | A1 * | 5/2015 | Morenius | G06F 21/57 |
| | | | | 713/172 |
| 2015/0263894 | A1 | 9/2015 | Kasturi et al. | |

OTHER PUBLICATIONS

Wei-Jen Wang et al., "Intelligent Application Migration within a Self-Provisioned Hybrid Cloud Environment", Dec. 10, 2011, Retrieved from the Internet: <URL: https://www.researchgate.net/profile/Wei_Jen_Wang/publication/265490553_Intelligent_Application_Migration_within_a_Self-Provisioned_Hybrid_Cloud_Environment/links/54b4e45d0cf28ebe92e496a8.pdf>, all pages.

Tian Guo et al., "Seagull: Intelligent Cloud Bursting for Enterprise Applications", 2012, Retrieved from the Internet: <URL: https://www.usenix.org/system/files/conference/atc12/atc12-final57.pdf>, all pages.

* cited by examiner

| SERVICE ID | PERFORMANCE | COST | SECURITY | EASE OF MIGRATION |
|---|---|---|---|---|
| #1 WEBSPHERE+DB2 | 80 | 90 | 75 | 80 |

FIG. 7A

| FACTOR NAME | FACTOR VALUE |
|---|---|
| CPU RATIO | 80 |
| MEMORY RATIO | 80 |
| DISK RATIO | 80 |
| I/O RATIO | 80 |
| NET DELAY | 80 |

| WEIGHT VALUE |
|---|
| 30% |
| 20% |
| 10% |
| 20% |
| 20% |

FIG. 7B

| FACTORS | CPU RATIO | MEM RATIO | DISK RATIO | I/O RATIO | NET DELAY |
|---|---|---|---|---|---|
| VALUE-SCORE MAPPING | <20%: 100<br><40%: 80<br><60%: 60<br><80%: 40<br><100%: 20 | <20%: 100<br><40%: 80<br><60%: 60<br><80%: 40<br><100%: 20 | <20%: 100<br><40%: 80<br><60%: 60<br><80%: 40<br><100%: 20 | <20%: 100<br><40%: 80<br><60%: 60<br><80%: 40<br><100%: 20 | <5ms: 100<br><20ms: 80<br><60ms: 60<br><120ms: 40<br>others: 20 |
| WEIGHT | 0.3 | 0.2 | 0.1 | 0.2 | 0.2 |

MIGRATION OF APPLICATIONS TO A COMPUTING ENVIRONMENT

BACKGROUND

The present exemplary embodiments relate generally to application assessment and more particularly, to systems, methods and computer program products for assessing outcome options for application migration to a target environment.

As technology advances, an enterprise is often presented with opportunities to improve upon or modernize its legacy data, applications, and services. One such example is that of migration to a cloud environment. Traditionally, the enterprise's data, applications, and services may be maintained on-premises behind a firewall. With the recent proliferation of cloud-based solutions, it has become apparent that capital and operational expenditures can be reduced by migrating all or part of the enterprise's data, applications, and services to the cloud.

In addition to cost savings, cloud migration potentially provides numerous other advantages such as dynamic scaling, high availability, multi-tenancy, and effective resource allocation. However, cloud migration also presents technical challenges and security concerns.

One particular technical challenge is effective resource utilization when deciding application migration to a cloud environment.

BRIEF SUMMARY

The various advantages and purposes of the exemplary embodiments as described above and hereafter are achieved by providing, according to an aspect of the exemplary embodiments, a computer-implemented method of migrating an application from one computing environment to a second computing environment comprising: obtaining a service topology and a deployment sequence from an existing application; choosing a deployment preference selected from the group consisting of a performance dimension, a cost dimension, a security dimension and an ease of migration dimension, each dimension containing factors and a weight of each of the factors; outputting the service topology and the deployment preference; reading service records for the chosen service topology and deployment preference from a repository, the service records containing a value score and weight mapping information of each factor of each service record; performing a mock conversion of migrating the application to the second computing environment according to the service topology and deployment preference of the service records; adjusting the value score and weight mapping of the service records according to the results of the mock conversion; responsive to a user choosing one service record representing a solution for migrating the application to the second computing environment, generating files for the solution; and deploying the solution into the second computing environment using the files; wherein the method is performed by one or more computing devices.

According to another aspect of the exemplary embodiments, there is provided a computer program product for migrating an application from one computing environment to a second computing environment, the computer program product comprising a computer readable storage medium having program instructions embodied therewith, the program instructions executable by a processor to cause the device to perform a method comprising: obtaining a service topology and a deployment sequence from an existing application; choosing a deployment preference selected from the group consisting of a performance dimension, a cost dimension, a security dimension and an ease of migration dimension, each dimension containing factors and a weight of each of the factors; outputting the service topology and the deployment preference; reading service records for the chosen service topology and deployment preference from a repository, the service records containing a value score and weight mapping information of each factor of each service record; performing a mock conversion of migrating the application to the second computing environment according to the service topology and deployment preference of the service records; adjusting the value score and weight mapping of the service records according to the results of the mock conversion; responsive to a user choosing one service record representing a solution for migrating the application to the second computing environment, generating files for the solution; and deploying the solution into the second computing environment using the files.

According to a further aspect of the exemplary embodiments, there is provided a system for migrating an application from one computing environment to a second computing environment comprising: a non-transitory storage medium that stores instructions; and a processor that executes the instructions to: obtain a service topology and a deployment sequence from an existing application; choose a deployment preference selected from the group consisting of a performance dimension, a cost dimension, a security dimension and an ease of migration dimension, each dimension containing factors and a weight of each of the factors; output the service topology and the deployment preference; read service records for the chosen service topology and deployment preference from a repository, the service records containing a value score and weight mapping information of each factor of each service record; perform a mock conversion of migrating the application to the second computing environment according to the service topology and deployment preference of the service records; adjust the value score and weight mapping of the service records according to the results of the mock conversion; responsive to a user choosing one service record representing a solution for migrating the application to the second computing environment, generate files for the solution; and deploy the solution into the second computing environment using the files.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
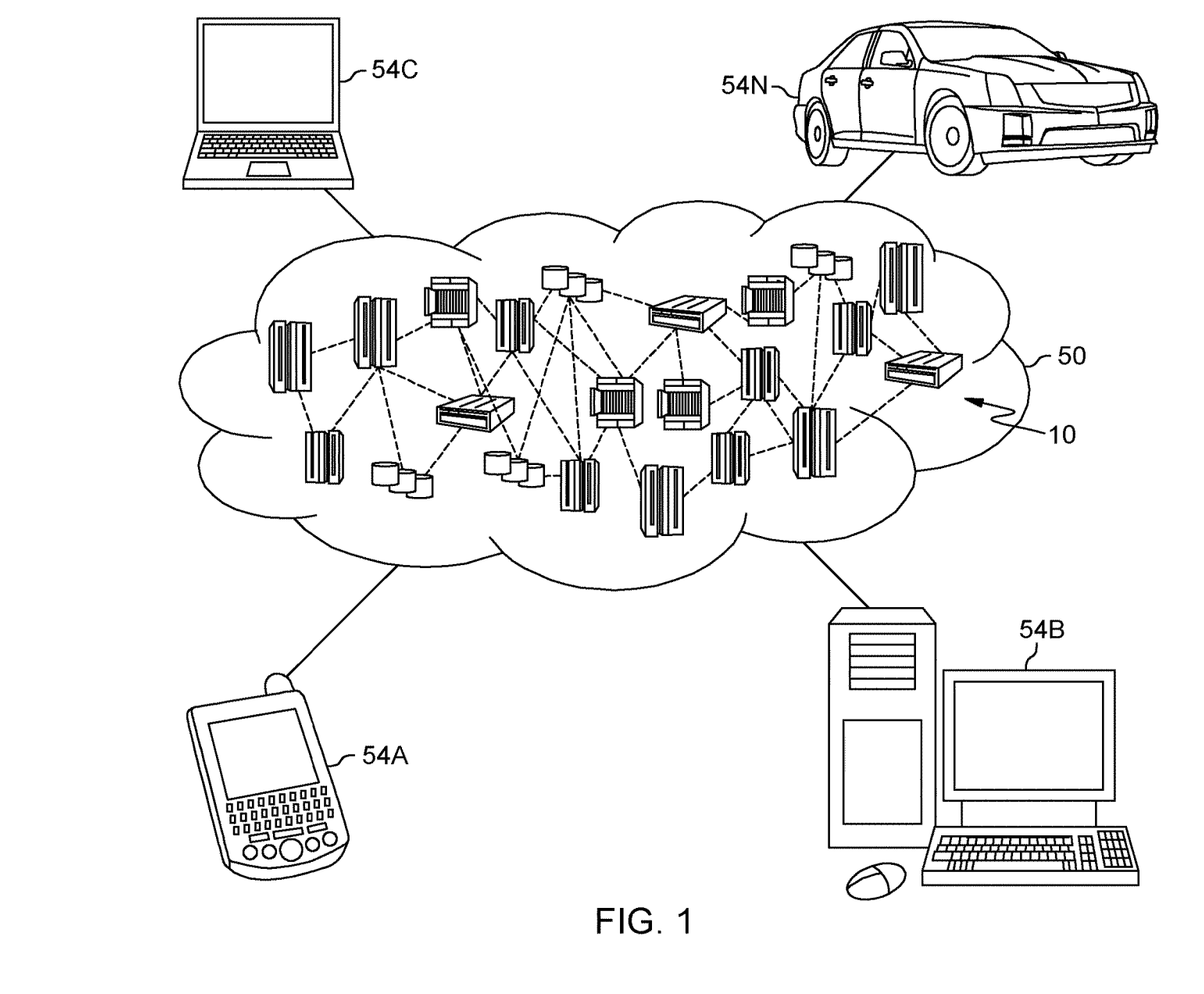
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
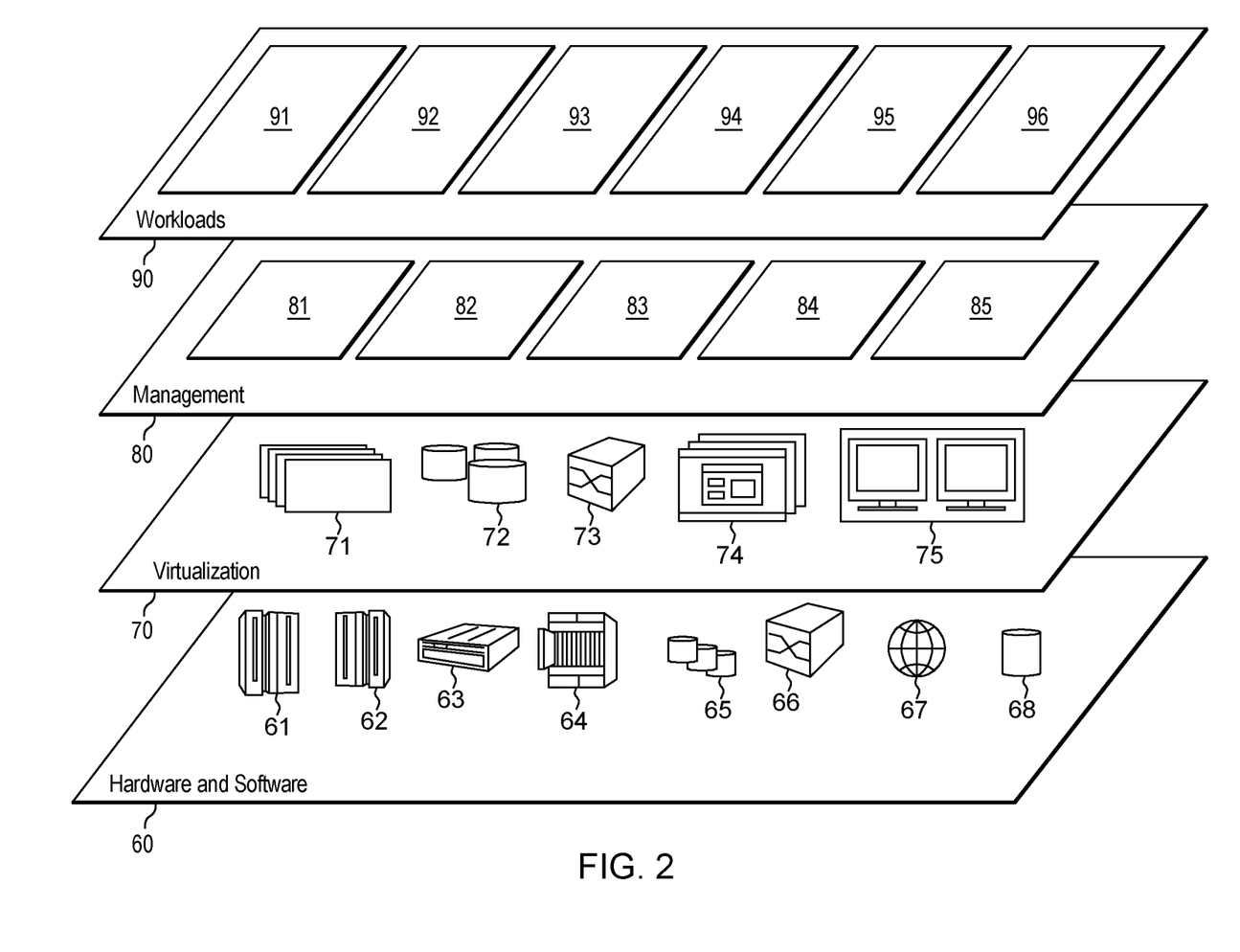
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application migration 96.

When migrating or converting applications to the cloud, a virtual machine (VM) cloud infrastructure or a container cloud infrastructure may be chosen.

A VM is a software-based environment geared to simulate a hardware-based environment for the sake of the applications it will host. With VMs, a software component called a hypervisor acts as an agent between the VM environment and the underlying hardware, providing the necessary layer of abstraction. A VM is an entire instance of an operating system, with a kernel and device drivers that has to contend with other VMs on a hypervisor for access to system resources.

Container technology offers an alternative method for virtualization in which a single operating system on a host can run many different applications from the cloud. Unlike VMs, containers don't need a full operating system to be installed within the container, and they don't need a virtual copy of the host server's hardware. Containers are able to operate with the minimum amount of resources to perform the task they were designed for. An entire stack of containers can run on top of a single instance of the operating system. The entire stack runs the same operating system as the host.

With container technology becoming more popular in cloud computing, organizations are eager to containerize their services. In addition, the resources usage of many of the virtual machine in the cloud environment are not saturated, and containerization can greatly improve resource utilization.

There are a lot of issues to be considered when containerizing and migrating an online application to hybrid cloud, such as performance, cost, security and ease of migration. It is not a best solution to migrate all components to a single cloud, many times the best solution is to spread them into different clouds. For example, a transaction system may consist of WebSphere, MQ, Database, Load Balance and other components. According to the needs of users and comprehensive factors analysis, the final migration results may be Database still in the private cloud, WebSphere migrated to Cloud A, MQ and Load Balance migrated to Cloud B.

The exemplary embodiments propose to convert or migrate an online application to containers in the hybrid cloud environment or to VMs in the hybrid cloud environment intelligently with a score system and simulator or to a mixture of VMs and containers in the hybrid cloud environment.

Figure 3:
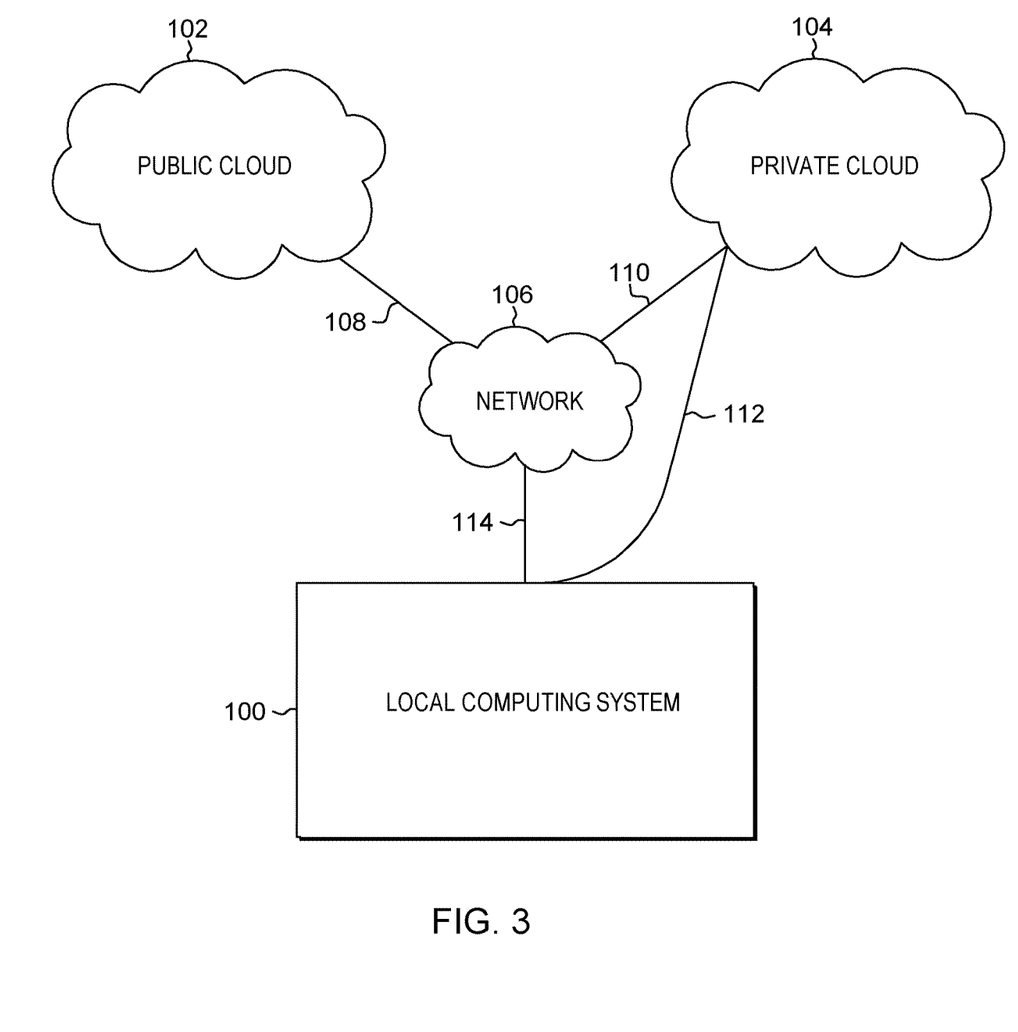
FIG. 3 depicts a hybrid cloud environment.

Referring now to FIG. 3, there is illustrated a hybrid cloud environment envisioned by the exemplary embodiments. An organization's internal information technology resources are indicated as local computing system 100. The organization may decide to outsource computing services to a public cloud 102 and/or a private cloud 104.

The local computing system 100 may connect to public cloud 102 through a network 106 such as the Internet, communication link 114 from the local computing system 100 to the network 106 and communication link 108 from the network 106 to public cloud 102.

The local computing system 100 in addition may connect to private cloud 104 through a network 106 such as the Internet, communication link 114 from the local computing system 100 to the network 106 and communication link 110 from the network 106 to private cloud 104. Since the private cloud 104 may actually be on the organization's premises, the local computing system 100 may connect directly to the private cloud 104 through communication link 112 without going through the network 106.

Figure 4:
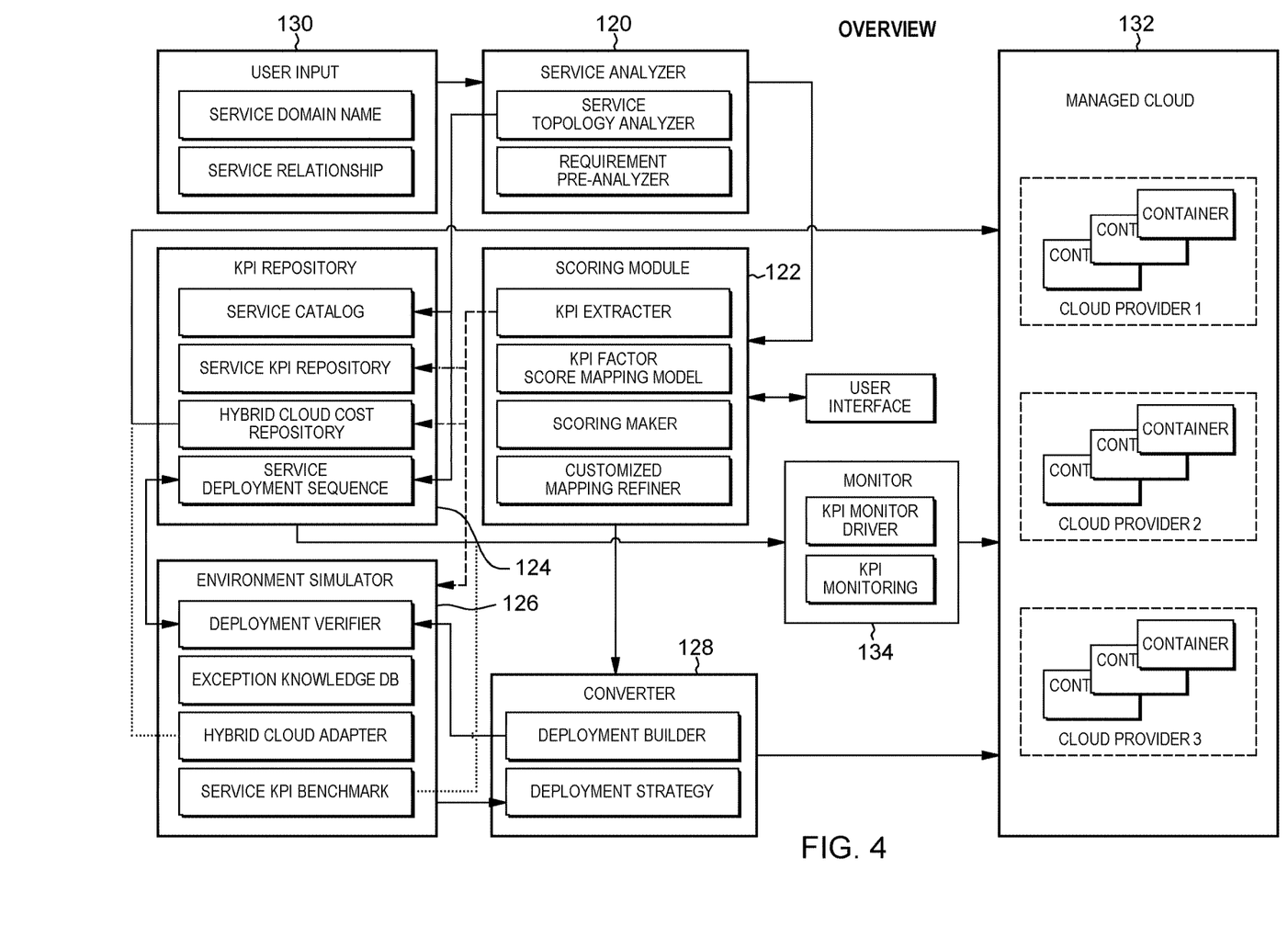
FIG. 4 depicts a broad overview of the components of the exemplary embodiments.

Referring now to FIG. 4, there is illustrated a broad overview of the components of the exemplary embodiments. A service analyzer 120 may receive user information from user input 130 regarding a service. A service is a combination of applications for a system. For example, an order system may consist of a web server application (e.g., Websphere) and a database application (e.g., DB2). The service analyzer 120 may receive service topology information from the KPI (Key Performance Indicator) repository 124. The service analyzer 120 will further choose a primary deployment preference based on the user's requirements. The service analyzer 120 will provide the service topology and primary deployment preference to a scoring module 122 which will score various solutions relating to migration of applications to a hybrid environment. The scoring module 122 will call the environment simulator 126 to do a mock conversion of the proposed solutions. The scoring module 122 outputs the chosen solution to the converter 128 which orchestrates the deployment of the components into a managed hybrid cloud 132. The monitor 134 updates the KPIs in the KPI repository 124.

Figure 5:
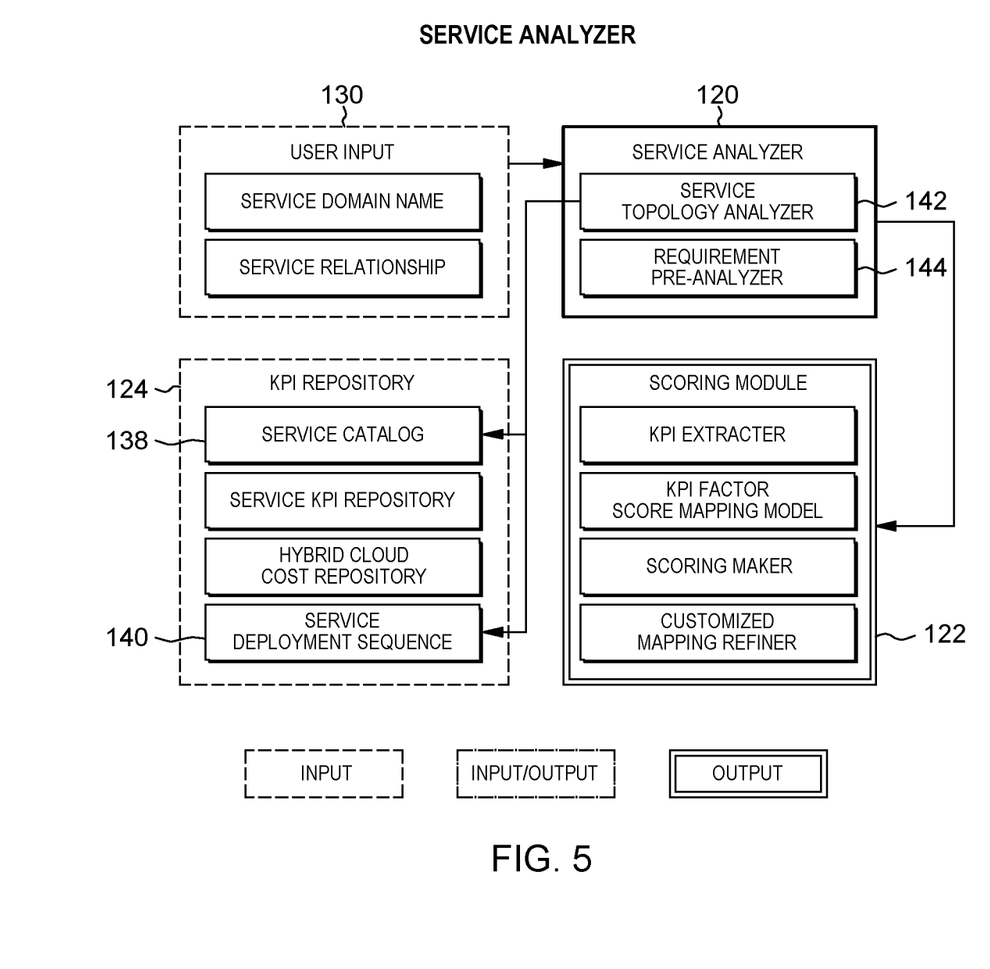
FIG. 5 depicts the operation of the service analyzer in more detail.

Referring now to FIG. 5, the operation of the service analyzer will be described in more detail. The service topology analyzer 142 will process service information from user input 130. The service information may include some general parameters including service IP address and service expose port, operating system and application information, or some key words that will help to query from a service catalog 138 in the KPI repository 124. The service topology analyzer 142 will get the service topology of the application by querying the service catalog 138 from the KPI repository 124. The service topology is a map that defines the various service/application layer components and their relationship, such as application component, database component, cache component, load balancer component, etc. The service catalog 138 provides the topology information of the deployed services, indicating which cloud node the service was deployed onto and the relationship with other kinds of services. The service topology analyzer 142 further may get the original deployment sequence according to the service deployment sequence in the service deployment sequence 140 of the KPI repository 124. The service deployment sequence is the deploy order of service components. For example, assume a service consisting of a web application, a database and a cache. While the database and cache can be handled in parallel, the web application needs to be handled after the database and cache are successfully handled.

Then, the requirement pre-analyzer 144 will analyze the user requirement from the user input 130 and choose one of the deployment preferences. Service scale is the main criteria used to choose the deployment preference which may be provided by the user. For example, a new startup company may want to use a less expensive cloud service with a tradeoff of a slower response time and performance. Cost factor may be the most important consideration for the startup company. Then in this case the deployment preference is choosing a low cost cloud resource.

The deployment preference is made up of 4 dimensions including a performance dimension, a cost dimension, a security dimension and an ease of migration dimension. Each of these relates to the performance, cost, security and ease of migration, respectively, that are considered when converting or migrating an application.

Each of these dimensions consists of some kinds of factors, and each factor has its own weight.

The performance dimension may include the CPU ratio, memory ratio, disk ratio, I/O ratio and net delay factors.

The cost dimension may include the CPU quota, memory quota, disk quota and network bandwidth factors.

The security dimension may include the isolation and vulnerable factors.

The ease of migration dimension may include the image matching rate and deployment order factors.

The factors listed above for each dimension are the main factors for each dimension but are not meant to be the exclusive factors for each dimension. Each dimension may include other factors not listed above.

The service topology and deployment preference are inputs to the scoring module 122.

The outline of the boxes surrounding each of the functions indicates whether it is an input, an input/output or output according to the key at the bottom of FIG. 5 and other Figures.

Figure 6:
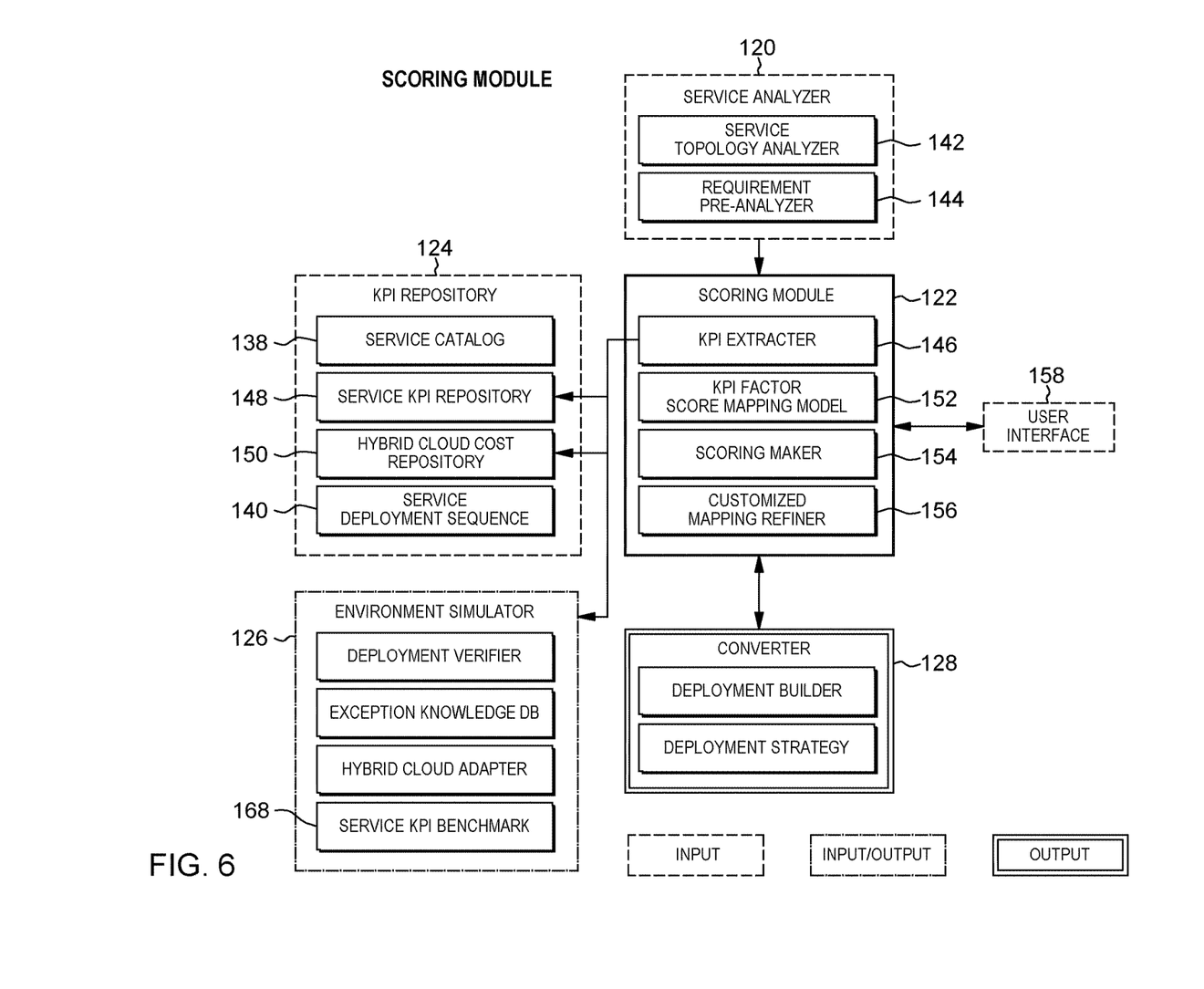
FIG. 6 depicts the operation of the scoring module in more detail.

Referring now to FIG. 6, the operation of the scoring module 122 will be described in more detail.

The scoring module 122 is invoked once the service topology and the chosen deployment preference are passed in.

The KPI extracter 146 in the scoring module 122 will collect the Top-N high score service records of the chosen deployment preference from the service KPI repository 148. The KPI repository 124 stores service scores in history of the four dimensions of deployment preference mentioned above. Top-N high score service records refer to the service records with the Top N scores with certain preference dimension, such as performance. N can be, for example, 5 or any other number such that the service records with the best scores are selected. For example, in the case of "Tomcat+MySQL" deployment, the search is for all existing "Tomcat+MySQL" instances in all managed clouds, calculate their performance score and then sort in order by the score. Here service record equals to all instances of deployment of "Tomcat+MySQL".

Figure 7A:
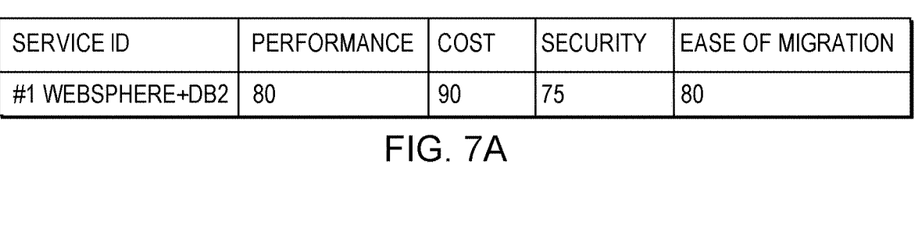
FIG. 7A depicts a service record for a deployed system.
Figure 7B:
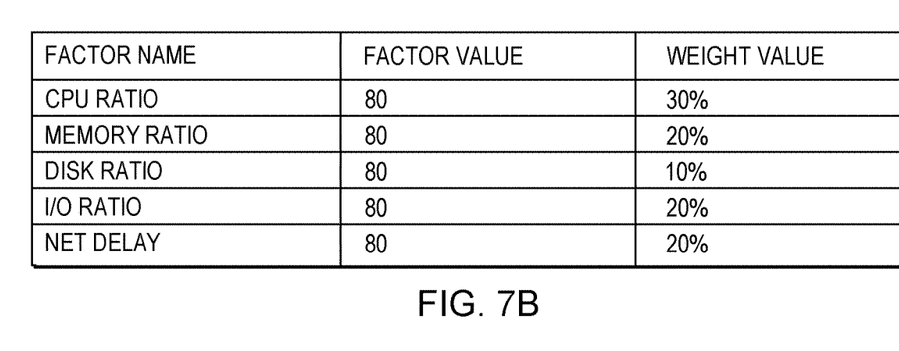
FIG. 7B depicts a detail store for a performance dimension of the service record in FIG. 7A

Each service record contains certain factors and the factor value-score and weight mapping information of each factor. FIG. 7A illustrates a service record for a service consisting of a webserver application (e.g., Websphere) and a database application (e.g., DB2). Each service record is a value combination of four dimensions, i.e., performance, cost, security and ease of migration. Each dimension has a detail store. FIG. 7B illustrates a detail store for the performance dimension.

Figure 7C:
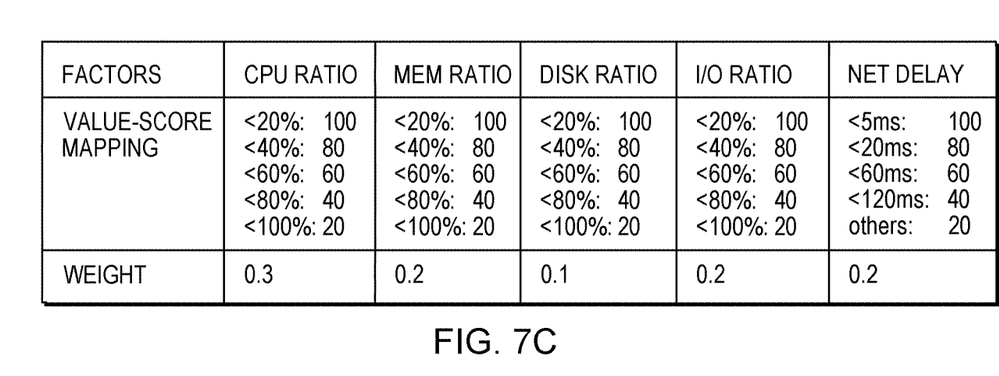
FIG. 7C depicts an example of the KPI factor score mapping model for performance-preference deployment for the service record in FIGS. 7A and 7B.

The value-score mapping is the relationship between the value and the score of each factor. FIG. 7C illustrates an example of the KPI factor score mapping model for performance-preference deployment for the service record illustrated in FIGS. 7A and 7B. For example, the data in row 'Value-Score Mapping' and column 'CPU Ratio' represents a simple score standard or mapping rule: if the CPU ratio is below 20%, the score of this factor is defined as 100. If the ratio is between 20% and 40%, the score of this factor then is defined as 80. In FIG. 7C, the value of the factor, for example CPU Ratio, may be 36%, and the score may come up with score 80 which is reflected in FIG. 7B. The service KPI benchmark 168 provided a standard for the value-score. For example, during current state, the service KPI benchmark 168 may indicate that the CPU ratio lower than 20% has a value-score 100, thus descending 40% to 80, 60% to 60, 80% to 40 and 100% to 20. The other factors are mapped using the same logic as CPU ratio. As default, weight may be equal with each for 5 factors as 20%, while user considers CPU ratio has much more weight to 30% and disk ratio down to 10%, thus these weights may change as indicated in FIGS. 7B and 7C.

In addition, the KPI extracter 146 will collect the cost information of each service record from the hybrid cost repository 150. The KPI extracter 146 will collect the cost data of each factor for the cost dimension, including but not limited to, cost per CPU (Core)/Memory (GB)/Disk(GB)/BandWidth(GB).

Then, the KPI extracter 146 will read the Top-N service records and call the environment simulator 126 to go through a mock conversion to the new computing environment according to these records, to retrieve new KPI values for every single factor.

Mock conversion is a deployment test to the new computing environment. Environment simulator 126 does a test deployment to validate whether the deployment can be successfully deployed to the target environment, which is called a mock conversion. It is a way to ensure the designed/planned deployment can be successfully done. The conversion may be from containers to VMs or from VMs to containers. The migration or conversion of the application could also be a combination of VMs and containers and the migration or conversion can be to a hybrid cloud.

The software platforms for the mock conversion can be those indicated below but not limited to these. For VM to VM conversion, there are many tools such as VMware vCenter Converter where a target VM is generated. As to Hybrid cloud, the VM can be uploaded as an image with provided RESTful APIs. For VM to container conversion, there is a library called vm2docker, which will help to convert a VM to docker images and push the docker images to a hybrid cloud and generate a container. As for container to container conversion, it is only necessary to push the target docker image to the hybrid cloud and generate a container with CLI, RESTful APIs or portal.

The KPI extracter 146 will also automatically adjust the value-score and weight mapping to reduce the system deviation. For example, as performance dimension has 5 factors, as default each factor weight is average 20% and while procedure is running, CPU may be more pivotal than Disk IO, then CPU weight is increased to 30% and Disk IO is decreased to 10%. By continuous monitoring and analyzing the performance outcome of the same workloads, new values for the value-score and mapping may be calculated. For example, before the workloads/applications are deployed, there may be 5 instances of the same workloads/applications in the same deployment environment which may be a hybrid cloud. From continuous monitoring, the best/average/worst CPU ratio performance among the 5 instances can be obtained. Then after the new instances/applications are deployed into a target environment, the same monitoring and analysis procedure will be re-run to calculate new best/average/worst CPU ratio performance. Here, for example, among the 5 instances, the best CPU ratio performance instance shows 30% utilization in a duration, then the CPU ratio 100 score is between >0 and <30%> utilization. The KPI values from the mock conversion will be used in the KPI factor score mapping model 152 to generate scores of each dimension. As a result, the record in the service KPI repository 148 will be updated to keep data accuracy. Continuous monitoring and analysis are used to calculate best/average/worst range for the same deployment patterns' KPI values. Based on that, the mapping model score range and weight may be determined.

The KPI extracter 146 will extract the value-score and weight mapping of the related factors into the KPI factor score mapping model 152 in the scoring module 122.

Next, the scoring maker 154 will generate scores for the Top-N service records according to the KPI factor score mapping model 152. The score for the Top-N service records of the chosen certain deployment preference is generated from the rule below:

$$\text{Score} = \sum_{i=1}^{n} \text{factor\_value\_score}_i * \text{factor\_weight}_i$$

where factor_value_score$_i$ is the value-score from the service record for each factor and factor_weight$_i$ is the weight of each factor.

Finally, the customized mapping refiner 156 will adjust the weight of factors in the KPI factor score mapping model 152 from the user interaction 158 and will call the scoring maker 154 to generate new scores for the Top-N service records. The user can adjust the weight of factors via the customized mapping refiner 156 which provides a user interface to choose the value of weight. However, the sum of these weights is 100%. Each service record represents a potential solution for the user to choose. Each of the Top-N service records above will have scores for every deployment preference dimension and can be visually shown in the form of a radar chart. A radar chart is a graphical method of displaying multivariate data in the form of a two-dimensional chart of three or more quantitative variables represented on axes starting from the same point. The radar chart is a chart and/or plot that consists of a sequence of equiangular spokes, called radii, with each spoke representing one of the variables.

With a radar chart, the user can compare the Top-N service records visually, and choose one record which has the highest scores in the desired dimensions. When a user chooses cost as the primary dimension, the calculated Top-N services may be ordered by cost score. This is a scenario in which the cost directly enters into the decision. When user chooses performance as the primary dimension, each service of the calculated Top-N services has a score radar map, which shows each score of the four dimensions described previously. The user may find that the Top-1 service record has a score 85 with performance dimension and a score of 70 with cost dimension, while the Top-2 service record has a score of 83 with performance dimension and a score of 90 with cost dimension. In this scenario, the user may choose the Top-2 service record with a little performance degradation but a best cost solution. Once the user has chosen one solution, the converter module 128 will be invoked.

Figure 8:
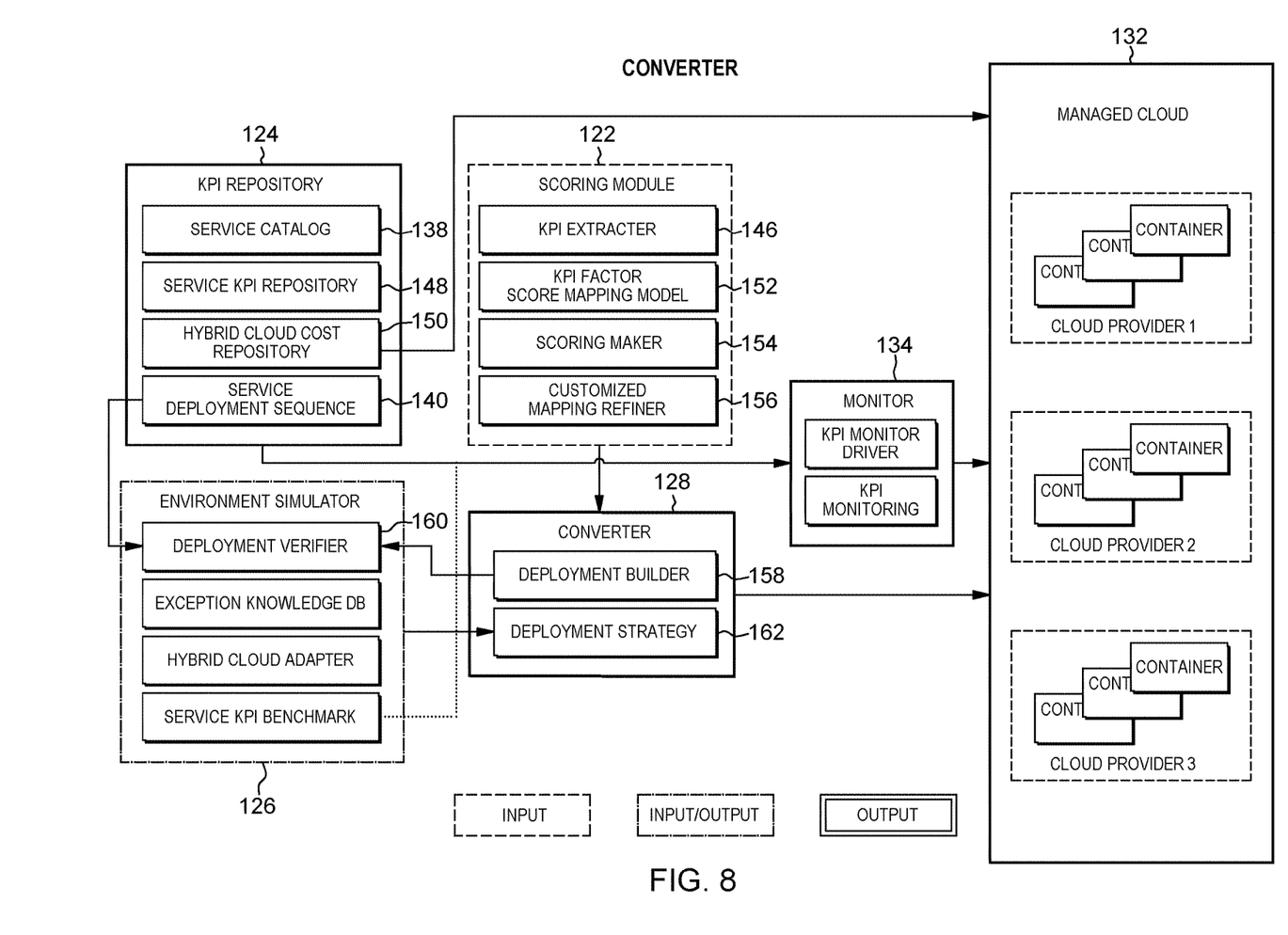
FIG. 8 depicts the operation of the converter 128 in more detail.

Referring now to FIG. 8, the operation of the converter 128 will be described in more detail.

The scoring module 122 generates the best converting or migration solution. The solution may be (1) converting VMs to containers or containers to VMs or (2) migrating the application to VMs or containers. The converter 128 gets the chosen solution of the services to be deployed from the scoring module 122.

The deployment builder 158 generates the appropriate files for the conversion or migration of these services, and invokes the deployment verifier 160 in the environment simulator 126 to simulate the conversion to ensure that the conversion can be done successfully, and return the dependency relationship of the services. The appropriate files may be dockerfiles for containerization or provision scripts or API calling list for conversion or migration to VMs. The detailed process for the simulation will be explained in more detail when the environment simulator 126 is described in more detail. When the simulation is successful, the deployment strategy 162 in the converter 128 will be able to arrange a container or VM or VM and container orchestration according to the services' dependency.

Figure 9:
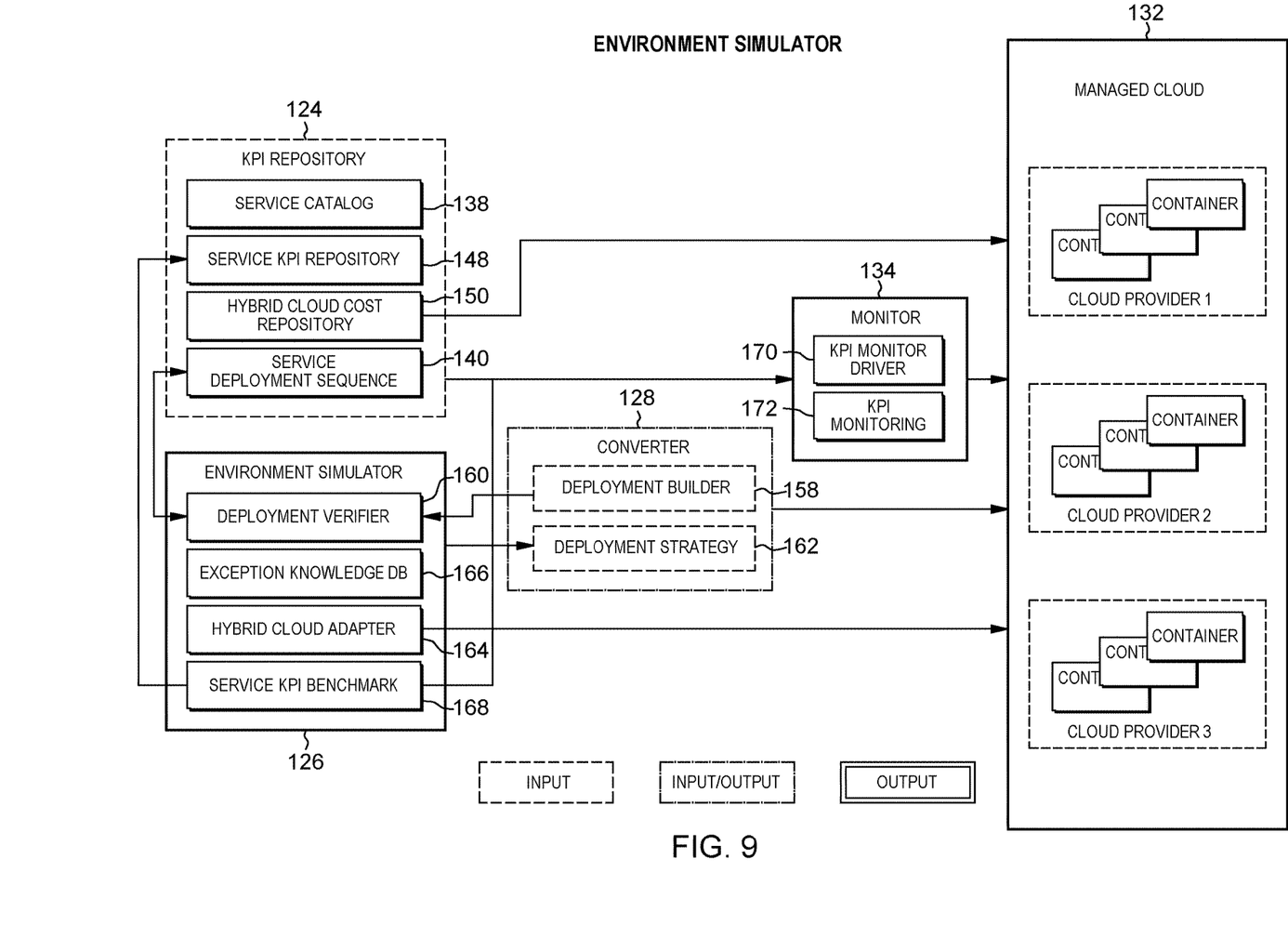
FIG. 9 depicts the operation of the environment simulator in more detail.

Referring now to FIG. 9, before the real conversion starts, the deployment verifier 160 in the environment simulator 126 will analyze the deployment order of the services by querying the service deployment sequence 140 in the KPI repository 124, and invoke the hybrid cloud adapter 164 in the environment simulator 126 to initiate the simulation environment on the targeted environment to verify the deployment process in a particular order, and finally to enrich the service deployment sequence 140 in return if the verification is successful. Enrichment of the service deployment sequence 140 means that the deployment sequence may be adjusted during the simulation when the user interacts with the deploy procedure. The targeted environment may be any simulation environment including a public, private or hybrid VM cloud environment or a container cloud environment or a container cloud environment mixed with a VM cloud environment.

If there's some error during the verification of the deployment process, the exception knowledge DB (database) 166 in the environment simulator 126 will store the error for later use.

Once the verification is done successfully, the service KPI benchmark 168 in the environment simulator 126 will invoke the monitor 134 to retrieve the KPIs of these simulated services, and calculate new scores of these service instances based on the KPI factor score mapping model. These new scores may be used to update the records in the Service KPI Repository 148 and to reduce the system deviation for the next reference. The monitor includes a KPI monitor driver 170 and a KPI monitoring 172. The KPI monitor driver 170 is used to collect the detailed KPI data for component nodes running in the hybrid cloud 132. The KPI monitoring 172 is used to collect KPI data by service, which is made up of many component nodes.

The service KPI benchmark 168 of the chosen deployment preference, after receiving the detailed KPI data from the KPI monitoring 172, is refreshed, and the corresponding service's KPI information will be synchronized into the Service KPI Repository 148 in the KPI repository 124.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method of migrating an application from one computing environment to a second computing environment comprising:
   obtaining a service topology and a deployment sequence from an existing application;
   choosing a deployment preference containing factors and a weight of each of the factors in the deployment preference;
   outputting the service topology and the deployment preference;
   reading service records for the chosen service topology and deployment preference from a repository, the service records containing a value score and weight mapping information of each factor of each service record;
   performing a mock conversion of migrating the application to the second computing environment according to the service topology and deployment preference of the service records;
   adjusting the value score and weight mapping of the service records according to the results of the mock conversion;
   responsive to a user choosing one service record representing a solution for migrating the application to the second computing environment, generating files for the solution; and
   deploying the solution into the second computing environment using the files;
   wherein the method is performed by one or more computing devices.

2. The computer-implemented method of claim 1 further comprising calculating a score for each of the service records after the mock conversion using the adjusted value score and weight mapping after the mock conversion by multiplying each value score by the weight from the weight mapping information for each factor and then summing the results of each multiplication according to the formula:

$$Score = \sum_{i=1}^{n} factor\_value\_score_i * factor\_weight_i$$

wherein the score is used as criteria by the user for choosing the service record representing the solution for migrating the application to the second computing environment.

3. The computer-implemented method of claim 1 wherein prior to deploying the solution, further comprising simulating the solution to determine if the solution will be successful.

4. The computer-implemented method of claim 1 further comprising monitoring the deployed solution to retrieve key performance indicators (KPIs) and update a database containing KPIs for the deployed solution.

5. The computer-implemented method of claim 1 wherein the one computing environment and the second computing environment are cloud computing environments and wherein the second computing environment is a hybrid cloud computing environment and wherein the deployed solution comprising migrating the application to a plurality of containers in the hybrid cloud environment.

6. The computer-implemented method of claim 1 wherein the one computing environment and the second computing environment are cloud computing environments and wherein the second computing environment is a hybrid cloud computing environment and wherein the deployed solution comprising migrating the application to a plurality of containers and a plurality of virtual machines in the hybrid cloud environment.

7. The computer-implemented method of claim 1 wherein the deployment preference is selected from the group consisting of a performance dimension, a cost dimension, a security dimension and an ease of migration dimension and each dimension containing the factors and the weight of each of the factors.

8. A computer program product for migrating an application from one computing environment to a second computing environment, the computer program product comprising a computer readable storage medium having program instructions embodied therewith, the program instructions executable by a processor to cause the device to perform a method comprising:
   obtaining a service topology and a deployment sequence from an existing application;
   choosing a deployment containing factors and a weight of each of the factors in the deployment preference;
   outputting the service topology and the deployment preference;
   reading service records for the chosen service topology and deployment preference from a repository, the service records containing a value score and weight mapping information of each factor of each service record;
   performing a mock conversion of migrating the application to the second computing environment according to the service topology and deployment preference of the service records;
   adjusting the value score and weight mapping of the service records according to the results of the mock conversion;
   responsive to a user choosing one service record representing a solution for migrating the application to the second computing environment, generating files for the solution; and deploying the solution into the second computing environment using the files.

9. The computer program product of claim 8 further comprising calculating a score for each of the service records after the mock conversion using the adjusted value score and weight mapping after the mock conversion by multiplying each value score by the weight from the weight mapping information for each factor and then summing the results of each multiplication according to the formula:

$$Score = \sum_{i=1}^{n} factor\_value\_score_i * factor\_weight_i$$

wherein the score is used as criteria by the user for choosing the service record representing the solution for migrating the application to the second computing environment.

10. The computer program product of claim 8 wherein prior to deploying the solution, further comprising simulating the solution to determine if the solution will be successful.

11. The computer program product of claim 8 further comprising monitoring the deployed solution to retrieve key performance indicators (KPIs) and update a database containing KPIs for the deployed solution.

12. The computer program product of claim 8 wherein the one computing environment and the second computing environment are cloud computing environments and wherein the second computing environment is a hybrid cloud computing environment and wherein the deployed solution comprising migrating the application to a plurality of containers in the hybrid cloud environment.

13. The method of claim 8 wherein the one computing environment and the second computing environment are cloud computing environments and wherein the second computing environment is a hybrid cloud computing environment and wherein the deployed solution comprising migrating the application to a plurality of containers and a plurality of virtual machines in the hybrid cloud environment.

14. The computer program product of claim 8 wherein the deployment preference is selected from the group consisting of a performance dimension, a cost dimension, a security dimension and an ease of migration dimension and each dimension containing the factors and the weight of each of the factors.

15. A system for migrating an application from one computing environment to a second computing environment comprising:
a non-transitory storage medium that stores instructions; and
a processor that executes the instructions to:
obtain a service topology and a deployment sequence from an existing application;
choose a deployment preference containing factors and a weight of each of the factors in the deployment preference;
output the service topology and the deployment preference;
read service records for the chosen service topology and deployment preference from a repository, the service records containing a value score and weight mapping information of each factor of each service record;
perform a mock conversion of migrating the application to the second computing environment according to the service topology and deployment preference of the service records;
adjust the value score and weight mapping of the service records according to the results of the mock conversion;
responsive to a user choosing one service record representing a solution for migrating the application to the second computing environment, generate files for the solution; and
deploy the solution into the second computing environment using the files.

16. The system of claim 15 further comprising calculate a score for each of the service records after the mock conversion using the adjusted value score and weight mapping after the mock conversion by multiplying each value score by the weight from the weight mapping information for each factor and then summing the results of each multiplication according to the formula:

$$Score = \sum_{i=1}^{n} factor\_value\_score_i * factor\_weight_i$$

wherein the score is used as criteria by the user for choosing the service record representing the solution for migrating the application to the second computing environment.

17. The system of claim 15 wherein prior to deploy the solution, further comprising simulate the solution to determine if the solution will be successful.

18. The system of claim 15 further comprising monitor the deployed solution to retrieve key performance indicators (KPIs) and update a database containing KPIs for the deployed solution.

19. The method of claim 15 wherein the one computing environment and the second computing environment are cloud computing environments and wherein the second computing environment is a hybrid cloud computing environment and wherein the deployed solution comprising migrating the application to at least one of a plurality of containers and a plurality of virtual machines in the hybrid cloud environment.

20. The system of claim 15 wherein the deployment preference is selected from the group consisting of a performance dimension, a cost dimension, a security dimension and an ease of migration dimension and each dimension containing the factors and the weight of each of the factors.

* * * * *